United States Patent [19]

Matsumura

[11] Patent Number: 5,538,262
[45] Date of Patent: Jul. 23, 1996

[54] ULTRA-HIGH VACUUM GASKET AND VACUUM APPARATUS USING THE SAME

[76] Inventor: Keizo Matsumura, Room 2-804, 39, Kameido 7-chome, Koto-ku, Tokyo, 136, Japan

[21] Appl. No.: 512,438

[22] Filed: Aug. 8, 1995

Related U.S. Application Data

[63] Continuation-in-part of Ser. No. 148,942, Nov. 8, 1993, abandoned.

[51] Int. Cl.⁶ ............................................. F16J 15/12
[52] U.S. Cl. .................. 277/228; 277/229; 277/235 A
[58] Field of Search ......................... 277/223, 227, 277/228, 229, 235 A, 236

[56] References Cited

U.S. PATENT DOCUMENTS

| | | | |
|---|---|---|---|
| 401,984 | 4/1889 | Udstad | 277/229 |
| 2,116,277 | 5/1938 | Meerbeck | 277/229 |
| 2,148,038 | 2/1939 | Raybould | 277/228 |
| 2,967,805 | 1/1961 | Forestek | 277/228 |
| 3,375,016 | 3/1968 | Jellinek et al. | 277/228 |
| 3,747,963 | 7/1973 | Shivak | 277/235 A X |
| 4,349,203 | 9/1982 | Schülke | 277/236 X |
| 4,383,694 | 5/1983 | Fontanna | 227/228 X |
| 4,630,833 | 12/1986 | Boyle et al. | 277/228 X |
| 5,147,691 | 9/1992 | Shimamoto et al. | 277/228 X |

FOREIGN PATENT DOCUMENTS

| | | |
|---|---|---|
| 55-36861 | 9/1980 | Japan . |
| 0003267 | of 1875 | United Kingdom ............ 277/228 |
| 0012041 | of 1905 | United Kingdom ............ 277/228 |
| 0111319 | 11/1917 | United Kingdom ............ 277/228 |
| 0489643 | 10/1936 | United Kingdom ............ 277/228 |
| 0468046 | 6/1937 | United Kingdom ............ 277/228 |
| 8503334 | 8/1985 | WIPO ............................ 277/227 |

*Primary Examiner*—William A. Cuchlinski, Jr.
*Assistant Examiner*—John L. Beres
*Attorney, Agent, or Firm*—Lowe, Price, LeBlanc & Becker

[57] ABSTRACT

An ultra-high vacuum gasket formed with a thin film in which a nuclear material is exposed only to a contact surface with a connecting portion of a surface of a ring of a soft nuclear material, and an atmospheric component or constituent is not permeated on a surface in contact with another atmosphere and a surface in contact with vacuum, and a vacuum apparatus which uses the ultra-high vacuum gasket at a location between the connecting portions.

7 Claims, 2 Drawing Sheets

ULTRA-HIGH VACUUM GASKET AND VACUUM APPARATUS USING THE SAME

This application is a continuation in part of application Ser. No. 08/148,942, filed Nov. 8, 1993, now abandoned.

BACKGROUND OF THE INVENTION

The present invention relates to an ultra-high vacuum gasket which is used in a vacuum apparatus using the ultra-high vacuum, a semiconductor manufacturing apparatus, an atomic nucleus physics experimental apparatus, a physics and chemistry experimental apparatus or the like, and to a vacuum apparatus using the ultra-high vacuum gasket.

An article disclosed in Japanese Patent Publication No. 36861/1980 invented by the same inventor has been known as a gasket covered by thermal deposition of an aluminum thin film on the entire or overall surface of a synthetic rubber (trade name: Byton) O-ring.

The ultra-high vacuum gasket is used whereby a superior vacuum apparatus has been proposed in which gas within the atmosphere does not invade into an ultra-high vacuum.

However, in a case where the ultra-high vacuum gasket in which the thin film is covered as a whole is used as a seal between the atmosphere and the ultra-high vacuum, the following problems arise except for the case where the urging force is sufficient:

When the urging force between the ultra-high vacuum gasket in which the thin film is covered as a whole and the flange is small or weak, the atmosphere slightly invades from a contact surface between the covered thin film and the flange, and the vacuum is difficult not to rise. For this reason, a large urging force is required for urging the gasket against the flange.

SUMMARY OF THE INVENTION

It is an object of the invention to provide an ultra-high vacuum gasket in which the atmosphere does not invade under a weak urging force, and a steam component or constituent or the like does not invade from the atmosphere, and to provide a vacuum apparatus using the ultra-high vacuum gasket.

In the invention, the weak urging force between the flange and the gasket means an urging force at the time urged on the order of 10 to 30 of a squeeze ratio or rate at an O-ring whose JIS (Japanese Industrial Standard) hardness is 70, and a strong urging force means an urging force equal to or more than 30 of the squeeze ratio.

Generally, in a flange, in a case where a synthetic rubber O-ring is used as a gasket between the atmosphere and vacuum, sealing is executed under a weak urging fierce. Even by the weak urging force, the atmosphere passing through a gap at a contact surface between the flange and the synthetic rubber can be ignored.

For this reason, a soft gasket such as synthetic rubber O-ring or the like is used, in many cases, as a seal between a glass material and a metal of the vacuum apparatus which has a glass portion and a metal portion.

The invention utilizes the above-described fact, and provides a gasket for ultra-high vacuum and a vacuum apparatus utilizing the same in which the contact surface is brought to a bare surface of the synthetic rubber, while the fact that the atmosphere in which a thin film such as an aluminum, gold, silver, tin, iron, copper, glass, titanium, molybdenum, stainless steel , nickel, tungsten, zirconium, and alloys and materials made of them, or the like whose vapor pressure is a value equal to or less than $10^{-6}$ Pa. passes through the synthetic rubber under a room temperature is isolated or cut-off keeps alive, the atmosphere or a steam component or constituent within the atmosphere or the like is not passed, and there is no leakage in the contact surface at a weak urging force.

The ultra-high vacuum gasket according to the invention is characterized in that a nuclear or core material exposed to an opposed surface in contact with a flange is exposed to a surface of an O-ring. Said O-ring consists of a core material (elastomer), such as a natural rubber, synthetic rubber, synthetic resin OF the like whose JIS hardness is equal to or less than 120, and as shown in FIG. 1, upon which is deposited a thin film, e.g., $10^{-3}$ to 100 μm thick, such as an aluminum, gold, silver, tin, iron, copper, glass, titanium, molybdenum, stainless steel, nickel, tungsten, zirconium and alloys and materials made of them or the like, whose vapor pressure is equal to or less than $10^{-6}$ Pa. under room temperature. The film, on a first surface that will be in contact with another atmosphere and on a second surface that will be in contact with a vacuum, is formed by deposition, such as thin plating, including electrolytic plating, electroless plating or the like or thermal deposition (vapor deposition), for example, sputter deposition, ion plating or the like.

Moreover, the vacuum apparatus according to the invention is characterized in that a nuclear material is exposed to the opposed surface in contact with a connecting portion at a location between the contact portions, and a gasket is arranged in contact with the thin film on a surface in contact with the atmosphere and a surface in contact with vacuum. As the vacuum apparatus, there is one in which both containers are made of a metal, or one in which the containers are made of a glass material, ill addition to one in which the containers are made of a glass material and a metal.

DETAILED DESCRIPTION OF THE PREFERRED EMBODIMENTS OF THE INVENTION

Figure 1:
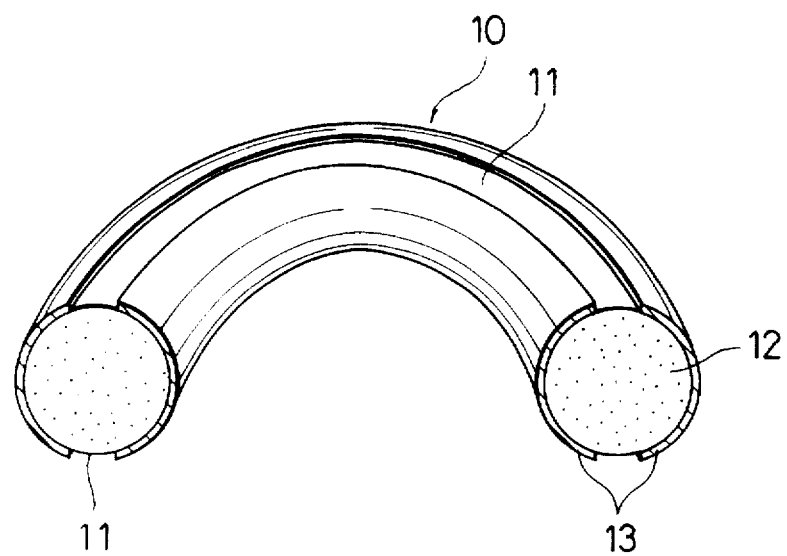
FIG. 1 is a partially cut-away perspective view showing an embodiment of a ultra-high vacuum gasket.

In FIG. 1, a ultra-high vacuum gasket 10 is arranged such that a nuclear material 12 is exposed to a pair of both-side opposed surfaces 11 and 11 which are in contact respectively with flanges, on a ring surface having a circular cross-sectional configuration, consisting of the nuclear material 12 whose material (elastomer) is a natural rubber, synthetic rubber, synthetic resin or the like and whose JIS hardness is equal to or less than 120. A thin film 13 e.g., $10^{-3}$ to 100 μm thick, whose vapor pressure in or under a room temperature is equal to or less than $10^{-6}$ Pa. is formed on a surface which is in contact with other atmosphere and which is in contact with a vacuum.

The thin film 13 is formed of an aluminum, gold, silver, tin, iron, copper, glass, titanium, molybdenum, stainless steel, nickel, tungsten, zirconium and alloys and materials made of them or the like, and is formed by plating, such as electrolytic plating, electroless plating or the like or by deposition such as thermal deposition (vapor deposition), sputter deposition, ion plating or the like.

Figure 2:
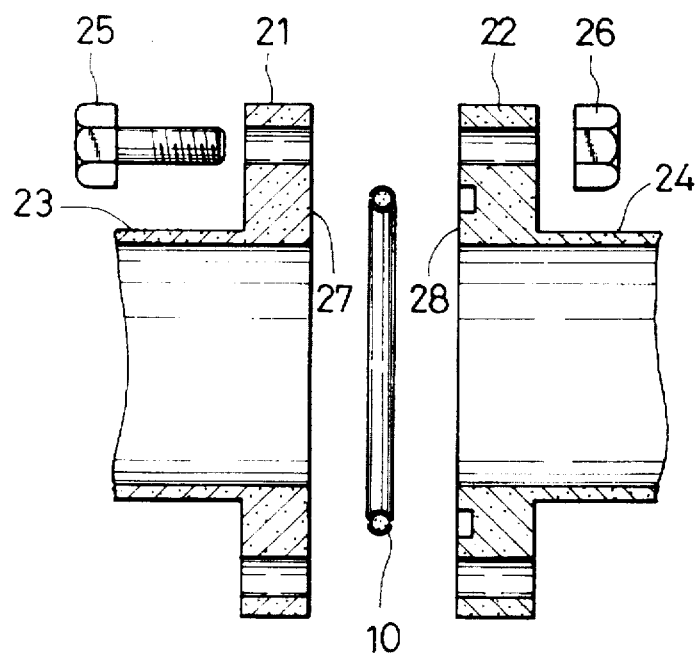
FIG. 2 is an exploded cross-sectional view showing a using example of the gasket shown in FIG. 1.

As shown in FIG. 2, the ultra-high vacuum gasket 10 is arranged between a pair of opposed surfaces 27 and 28 of the respective flanges 21 and 22 which are formed on vacuum pipes 23 and 24, respectively, in the vacuum apparatus. The flanges 21 and 22 are tightened and fixedly mounted by bolts 25 and nuts 26 such that the opposed surfaces 11 and 11 on both sides from which the nuclear material 12 is exposed are in contact, respectively, with the opposite surfaces 27 and 28 of the respective flanges 21 and 22.

Figure 3:
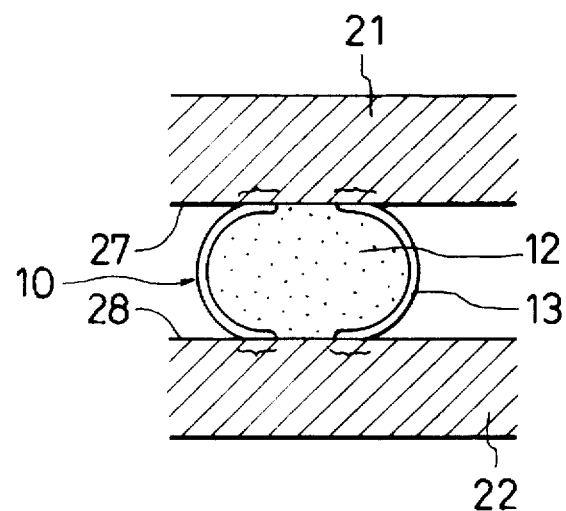
FIG. 3 is an exploded cross-sectional view of a principal portion of the using example of the gasket shown in FIG. 1.

Then, as shown in FIG. 3, the opposed surfaces 11 and 11 of the nuclear material 12 of the ultra-high vacuum gasket 10 are urged by the opposed surfaces 27 and 28 of the respective flanges 21 and 22 so that the nuclear material 12 is deformed. Thus, the opposed surfaces 11 and 11 of the nuclear material 12 and the opposed surfaces of the respective flanges 21 and 22 are in gas-tightly contact with each other so that passage of air from a gap therebetween is cut-off or isolated.

Air tending to pass through an interior of the nuclear material 12 from surfaces thereof is isolated by the thin film 13 whose vapor pressure is equal to or less than $10^{-6}$ Pa. and which is formed on the surface of the nuclear material 12.

In connection with the above, as shown in FIG. 3 the thin film 13 may slightly get into contact surfaces between the flanges 21 and 22 and the nuclear material 12.

Figure 4:
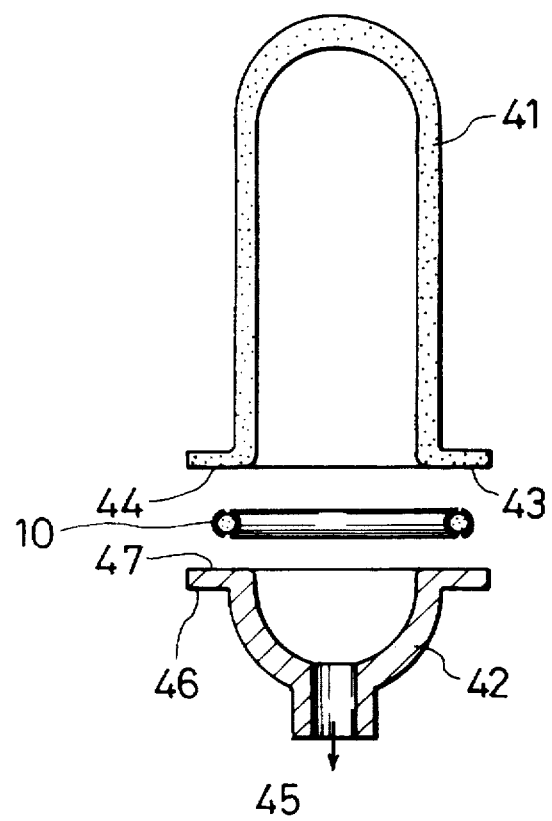
FIG. 4 is an exploded cross-sectional view showing an embodiment of a vacuum apparatus.

FIG. 4 shows an embodiment of the vacuum apparatus which comprises a vacuum container using the ultra-high vacuum gasket 10. A glass vacuum container 41 has a connection consisting of a glass flange 43. The glass flange 43 has a constant, surface 44 on a side surface of the glass flange 43. A metallic vacuum container 42 has a metal flange 46. A connection consisting of the metal flange 46 has a contact surface 47 on a side surface of the metal flange 46. These flanges 43 and 46 are normally tightened by bolts (not shown). There is a case where the glass flange 43 is arranged such that a metal flange (not shown) is abutted against the metal flange 46 from the glass vacuum container 41 and is tightened therewith. Further, there is also a case where the glass flange 43 is pressed by an urging force due to vacuum and own weight of a glass portion or section like a bell jar. In either case, the flanges 43 and 46 are tightened to each other by normal means. A portion of the vacuum container is connected to a vacuum pump through a passage 45. There is a case where other branch lines are connected to the vacuum container. In this manner, the contact surfaces 44 and 47 are in close contact with each other between the contact surface 44 of the glass flange 43 of the vacuum container and the contact surface 47 of the metal flange 46 so that the gasket 10 is arranged. The gasket 10 is arranged such that the nuclear material 12 of a material whose JIS hardness is equal to or less than 120 is exposed to the opposed surfaces at which the contact surfaces 44 and 47 are in contact with each other. Thus, the thin film 13 whose vapor pressure is $10^{-6}$ Pa. is formed in a surface in vacuum contact with the surface and the vacuum in contact with the atmosphere, under a room temperature.

Accordingly, leads of the contact surfaces 44 and 46 are stopped by a weak urging force, and it is prevented that the contact surfaces 44 and 47 pass through the gasket 10 such as steam or vapor pressure under the atmosphere. Accordingly, a reaching vacuum degree becomes a more low pressure. Reaching time to a target reaching degree of vacuum is reduced.

In this manner, it is of course that the ultra-high vacuum gasket 10 is suitable for a gap between a metal flange and a metal flange. The ultra-high vacuum gasket 10 is also suitable for a seal between the glass flange and the metal flange.

This is similar to a case where the vacuum apparatus is all made of a metal.

What is claimed is:

1. An ultra-high vacuum gasket comprising a ring formed of core material exhibiting a JIS hardness value up to 120, the said ring of core material having a continuous surface, the axial portion of which is to be exposed to a vacuum, the circumferential portion of which is to be exposed to the atmosphere and the intermediate portions of which are to be exposed to members to be joined, said gasket having thin films formed on said axial and circumferential portions, leaving only narrow regions of exposed core material between the axial and circumferential films, using a substance the vapor pressure of which at room temperature is up to $10^{-6}$Pa., by means of a thin plating method inclusive of electrolytic plating, electroless plating and vapor deposition, the latter including thermal deposition, sputter deposition and ion plating.

2. An ultra-high vacuum gasket in accordance with claim 1, wherein the core material is selected from the group consisting of natural rubber, synthetic rubber, and synthetic resin.

3. An ultra-high vacuum gasket in accordance with claim 1, wherein the thin film is selected from the group consisting of aluminum, gold, silver, tin, iron, copper, glass, titanium, molybdenum, stainless steel, nickel, and tungsten.

4. A vacuum apparatus comprising an ultra-high vacuum gasket disposed between and in close contact with members of said vacuum apparatus being joined, said ultra-high vacuum gasket comprising a ring formed of core material exhibiting a JIS hardness value up to 120, the said ring of core material having a continuous surface, the axial portion of which is to be exposed to a vacuum, the circumferential portion of which is to be exposed to the atmosphere and the intermediate portions of which are to be exposed to members to be joined, said gasket having thin films formed on said axial and circumferential portions, leaving only narrow regions of exposed core material between the axial and circumferential films, using a substance the vapor pressure of which at room temperature is up to $10^{-6}$Pa., by means of a thin plating method inclusive of electrolytic plating, electroless plating and vapor deposition, the latter including thermal deposition, sputter deposition and ion plating.

5. A vacuum apparatus in accordance with claim 4, wherein the members to be joined comprise glass and metal.

6. A vacuum apparatus in accordance with claim 4, wherein the members to be joined comprise glass and flanges.

7. A vacuum apparatus in accordance with claim 4, wherein at least one of the members to be joined constitutes a part of a vacuum container.

\* \* \* \* \*